United States Patent
Nykamp

(10) Patent No.: US 10,788,832 B2
(45) Date of Patent: Sep. 29, 2020

(54) METHOD OF DETERMINING AN ACQUISITION GUIDANCE PATH FOR A VEHICLE AND AN ACQUISITION GUIDANCE PATH SYSTEM FOR A VEHICLE

(71) Applicant: DEERE & COMPANY, Moline, IL (US)

(72) Inventor: Alex J. Nykamp, Edgerton, MN (US)

(73) Assignee: Deere & Company, Moline, IL (US)

( * ) Notice: Subject to any disclaimer, the term of this patent is extended or adjusted under 35 U.S.C. 154(b) by 273 days.

(21) Appl. No.: 16/034,494

(22) Filed: Jul. 13, 2018

(65) Prior Publication Data

US 2020/0019171 A1    Jan. 16, 2020

(51) Int. Cl.
  *G05D 1/02*    (2020.01)
  *G01C 21/20*    (2006.01)
  (Continued)

(52) U.S. Cl.
  CPC .......... *G05D 1/0212* (2013.01); *G01C 21/20* (2013.01); *G01C 21/3415* (2013.01);
  (Continued)

(58) Field of Classification Search
  CPC ..... E01C 19/004; B62D 5/065; B62D 15/025; B62D 3/14; B62D 6/005; B62D 6/003; B62D 1/28; B62D 5/091; B62D 15/029; G05D 1/0265; G05D 1/02; G05D 1/0212; G05D 1/0055; G05D 1/0278; G05D 1/0257; G05D 1/0246; G05D 1/0231; G05D 2201/0201; G05D 1/0088; G05D 1/0891; B60W 40/064; B60W 50/06; B60W 50/14; B60W 30/12; B60W 40/114; B60W 40/00; B60W 40/112; B60W 50/0098; B60W 40/076; G06K 9/00812; G06K 9/4604; G06K 9/00791; G06K 9/00798;
  (Continued)

(56) References Cited

U.S. PATENT DOCUMENTS 4,307,329 A * 12/1981 Taylor ...................... B62D 1/28
                                                         180/168
5,404,087 A *  4/1995 Sherman .............. G05D 1/0265
                                                         180/168

(Continued)

FOREIGN PATENT DOCUMENTS

EP     3290297 A1    3/2018
EP     3300562 A1    4/2018

OTHER PUBLICATIONS

European Search Report issued in counterpart European Patent Application No. 19184414.1 dated Dec. 13, 2019 (5 pages).

*Primary Examiner* — Behrang Badii

(57) ABSTRACT

A system and method of determining an acquisition guidance path of a vehicle includes defining a desired guidance path for travel by the vehicle, determining a first acquisition factor of the acquisition guidance path between the vehicle and the desired guidance path, determining a second acquisition factor defining a ratio between a heading error and a lateral error of the acquisition guidance path, and calculating the acquisition guidance path based on the first acquisition factor and the second acquisition factor to control travel of the vehicle to the desired guidance path.

20 Claims, 6 Drawing Sheets

(51) Int. Cl.
*G01C 21/34* (2006.01)
*B62D 15/02* (2006.01)
*B60W 40/114* (2012.01)
*B62D 3/14* (2006.01)
*B60W 40/064* (2012.01)
*B60W 30/02* (2012.01)
*B62D 6/00* (2006.01)

(52) U.S. Cl.
CPC ........... *B60W 30/02* (2013.01); *B60W 40/064* (2013.01); *B60W 40/114* (2013.01); *B62D 3/14* (2013.01); *B62D 6/00* (2013.01); *B62D 15/02* (2013.01); *G05D 1/02* (2013.01); *G05D 2201/0201* (2013.01)

(58) Field of Classification Search
CPC ..... G08G 1/167; A01B 69/008; E02F 9/2045; B60Q 9/005; B60T 7/22; B60L 53/37; G06T 7/74; G01C 21/20; G01C 21/3415; G01S 19/45; G01S 19/14
See application file for complete search history.

(56) References Cited

U.S. PATENT DOCUMENTS

| | | |
|---|---|---|
| 7,127,340 B2 | 10/2006 | Schick et al. |
| 8,190,364 B2 | 5/2012 | Rekow |
| 10,124,827 B2 | 11/2018 | Nykamp et al. |
| 2018/0057045 A1* | 3/2018 | Nykamp ................. B62D 5/065 |
| 2019/0256102 A1* | 8/2019 | Schleicher ............ E01C 19/004 |

* cited by examiner

US 10,788,832 B2

METHOD OF DETERMINING AN ACQUISITION GUIDANCE PATH FOR A VEHICLE AND AN ACQUISITION GUIDANCE PATH SYSTEM FOR A VEHICLE

FIELD OF THE DISCLOSURE

The present disclosure relates generally to vehicle guidance paths and, in particular, guidance path acquisition for vehicles.

BACKGROUND OF THE DISCLOSURE

A path planner may be used to determine one or more path plans for a vehicle to cover a work area. In a non-limiting example, the work area may represent a field for growing a crop or other vegetation. The vehicle may need to traverse the entire work area or a portion thereof to plant a crop (or precursor thereto), treat a crop (or precursor thereto), or harvest a crop, to name non-limiting examples. To autonomously travel to or acquire a desired guidance path, an automatic steering system of the vehicle and/or other vehicle system may control the steering of the vehicle along an acquisition guidance path. However, an acquisition guidance path plan to the desired guidance path may not be sufficiently direct and may result in reduced energy efficiency of the vehicle, time delay, and/or missed or otherwise undesireable coverage by the vehicle, such as coverage by a towed implement to name a non-limiting example. In contrast, an aggressive acquisition guidance path plan to the desired guidance path may result in excess overshoot of the desired guidance path by the vehicle, thereby resulting in reduced vehicle efficiency, time delay, and/or travel over an undesirable area or impassible boundary.

Therefore, there exists a need in the art for a method of determining an acquisition guidance path for a vehicle and an acquisition guidance path system for a vehicle that provides efficient travel for a vehicle to a desired guidance path while controlling overshoot and undershoot by the vehicle of the desired guidance path.

SUMMARY OF THE DISCLOSURE

According to an aspect of the present disclosure, a method of determining an acquisition guidance path of a vehicle is provided. The method includes defining a desired guidance path for travel by the vehicle, determining a first acquisition factor of the acquisition guidance path between the vehicle and the desired guidance path, determining a second acquisition factor defining a ratio between a heading error and a lateral error of the acquisition guidance path, and calculating the acquisition guidance path based on the first acquisition factor and the second acquisition factor to control travel of the vehicle to the desired guidance path.

According to an aspect of the present disclosure, an acquisition guidance path system for a vehicle is provided. The system includes a location-determining receiver configured to determine the location of the vehicle, a data storage device configured to provide a desired guidance path for travel by the vehicle, a first acquisition factor of an acquisition guidance path between the vehicle and the desired guidance path, and a second acquisition factor defining a ratio between a heading error and a lateral error of the acquisition guidance path, and an electronic data processor configured to calculate the acquisition guidance path based on the first acquisition factor and the second acquisition factor to control travel of the vehicle to the desired guidance path.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
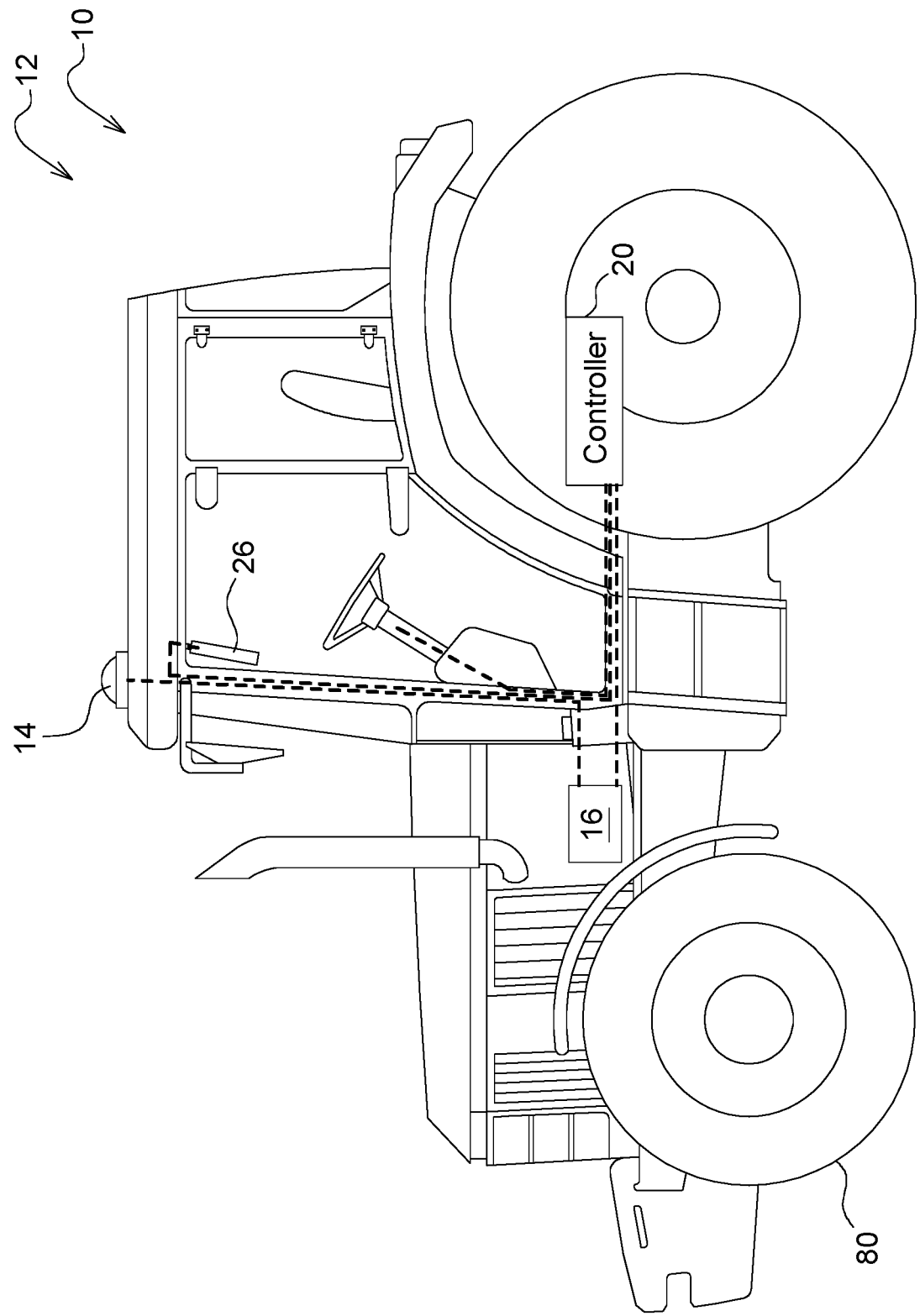
FIG. 1 illustrates an acquisition guidance path system for a vehicle in accordance with an embodiment of the present disclosure.

Referring to FIG. 1, an acquisition guidance path system 10 for a vehicle 12 is illustrated in accordance with an embodiment of the present disclosure. The system 10 of an embodiment includes a location-determining receiver 14 configured to determine the location of the vehicle 12. The location-determining receiver 14 of the illustrated embodiment includes a global positioning system (GPS) receiver, but may include any one or more components configured to determine a location of the vehicle 12. In an embodiment, the receiver 14 is further configured to determine an attack angle or orientation of the vehicle 12. The system 10 further includes a steering angle sensor 16, including any component capable of determining an angle of one or more wheel(s) 80, track(s), and/or other turning component(s) of the vehicle 12 in an embodiment. In a further embodiment, the system 10 does not include a steering angle sensor, but rather determines or estimates the steering or wheel angle based on one or more inputs and/or stored data.

Figure 2:
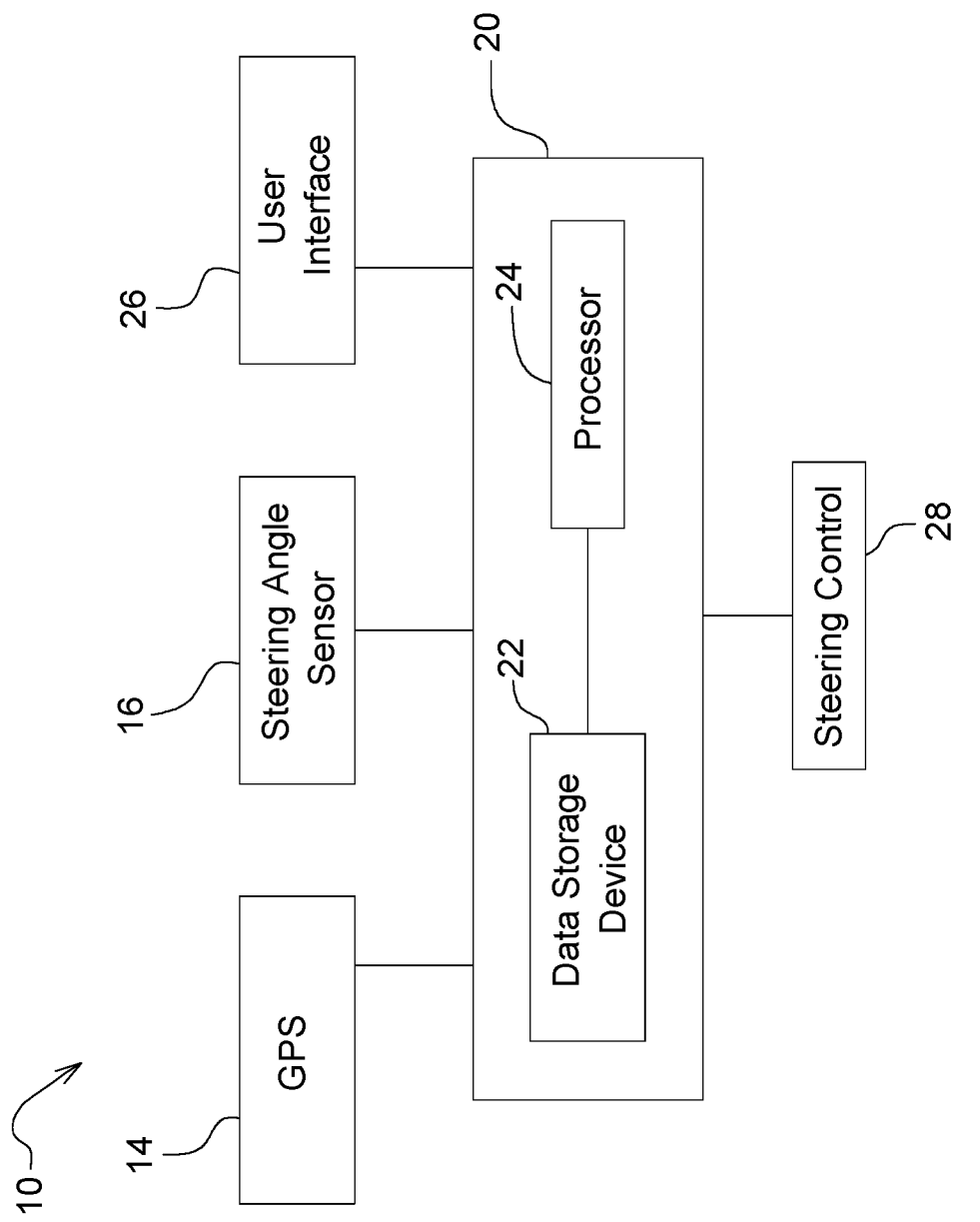
FIG. 2 is a schematic view of an acquisition guidance path system for a vehicle in accordance with an embodiment of the present disclosure.

Referring now to FIG. 2 with continuing reference to FIG. 1, the system 10 further includes a controller 20 in an embodiment having a data storage device 22 and an electronic data processor 24. The system 10 and vehicle 12 further include a user interface 26 that may include a display and/or other output means and/or a keyboard, touchpad, joystick, and/or other input means from the user or operator. As used herein, the terms "user" or "operator" include, without limitation, one or more people positioned in the vehicle 12, outside the vehicle 12, and/or remotely from the vehicle 12.

As shown in FIG. 2, in the illustrated embodiment of the system 10, the controller 20 receives data from the receiver 14, the user interface 26, and/or the steering angle sensor 16, the processor 24 receives software instructions and/or data from the data storage device 22 with the data from the receiver 14, the user interface 26, and/or the steering angle sensor 16, and transmits control output to a steering control unit 28. Although shown as being separated in FIG. 2, in one or more additional embodiments, the receiver 14, the steering control unit 28, and/or any other electronic component may form part of the controller 20.

Figure 3:
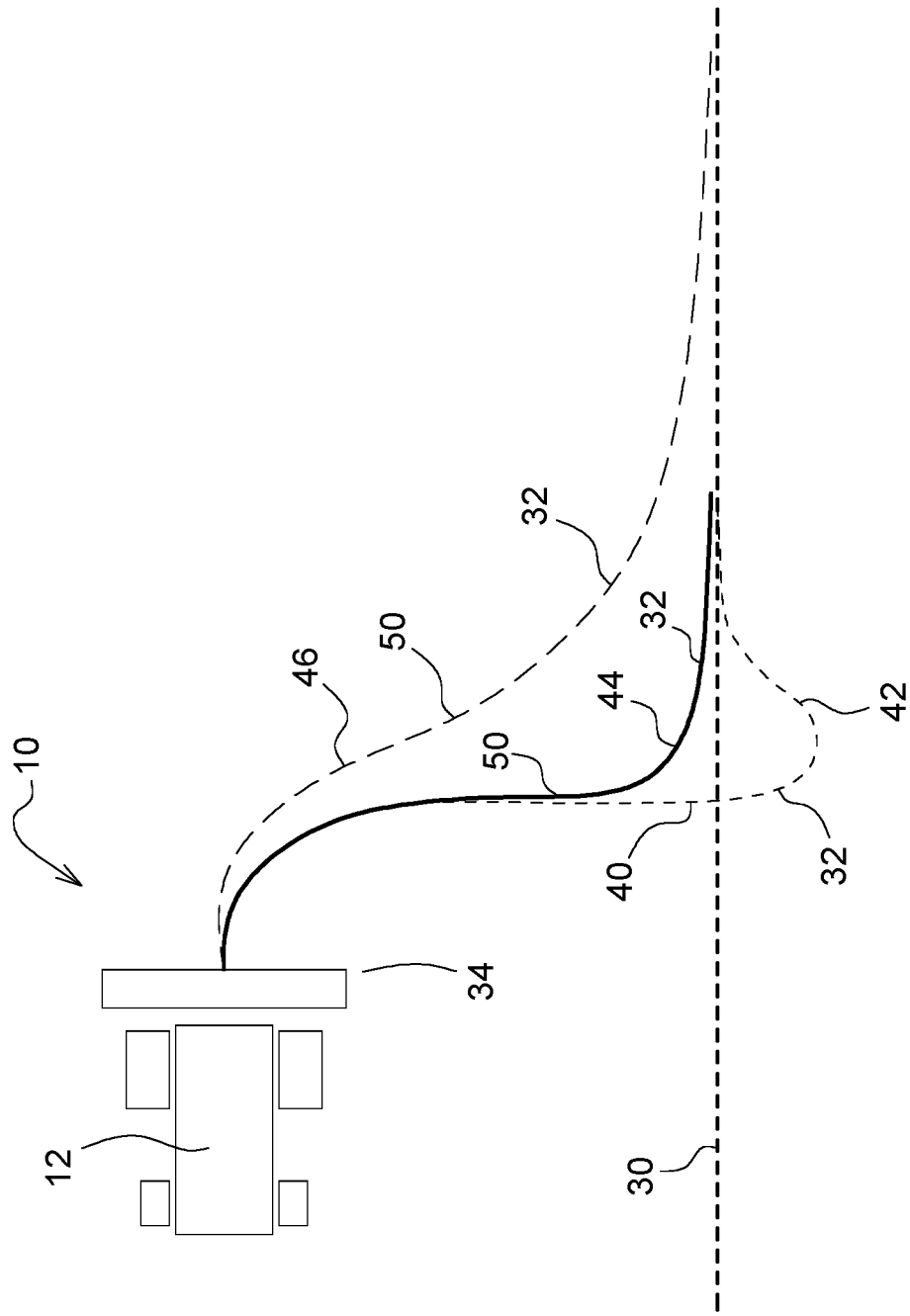
FIG. 3 illustrates acquisition guidance paths of an acquisition guidance path system for a vehicle in accordance with an embodiment of the present disclosure.
Figure 4:
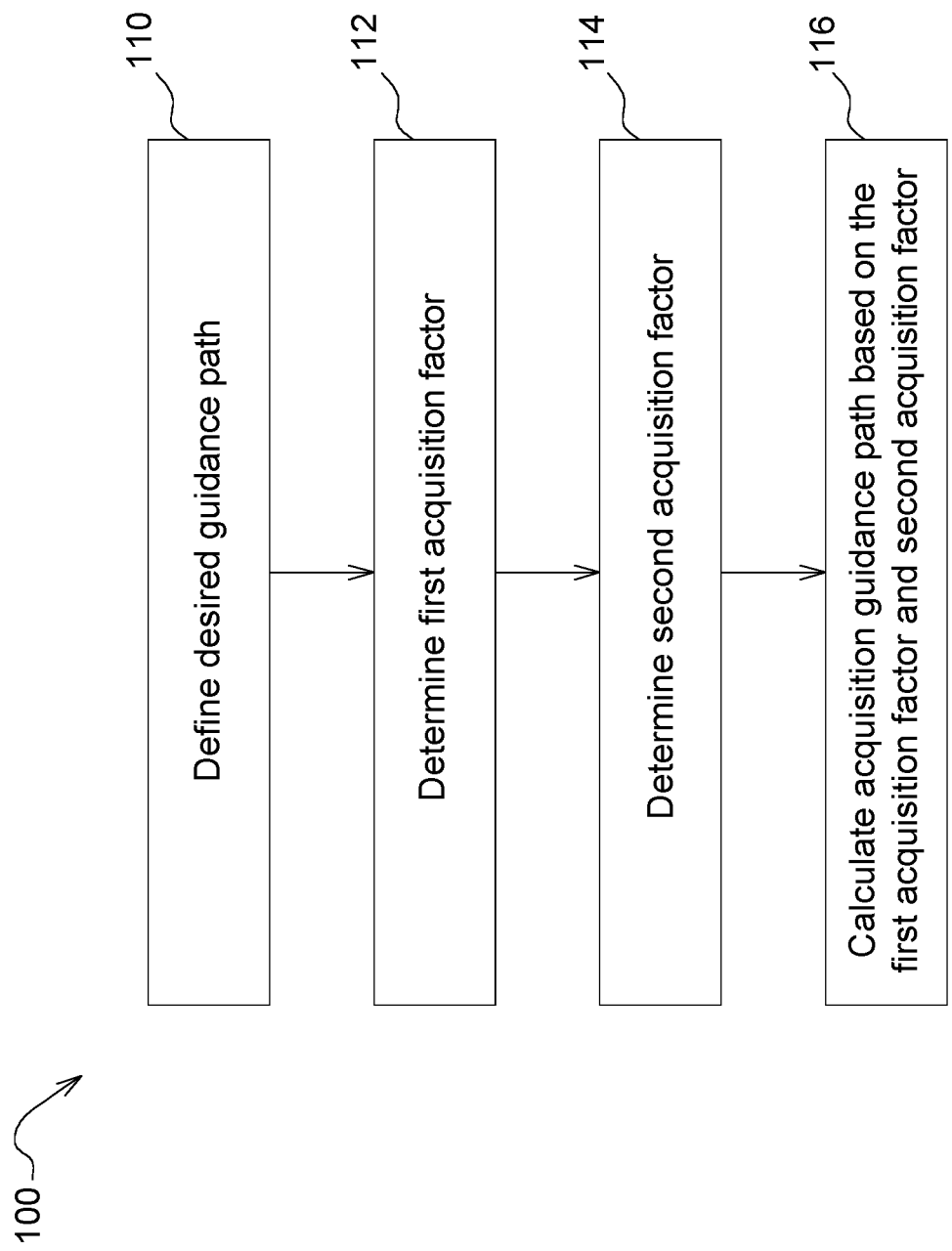
FIG. 4 illustrates a method of determining an acquisition guidance path for a vehicle in accordance with an embodiment of the present disclosure.

Specifically, and with reference now to FIGS. 3 and 4, a method 100 of determining an acquisition guidance path 32 of the vehicle 12 is further provided. The controller 20 or other portion of the system 10 defines, at step 110, a desired guidance path 30 to which the vehicle 12 is intended to traverse. The desired guidance path 30 is a straight line in an embodiment, a curved path in another embodiment, or a combination thereof in another embodiment. In one embodiment, the vehicle 12 executes a predetermined, independent, and/or otherwise separate path plan once the vehicle 12 reaches the desired guidance path 30. The vehicle 12 and system 10 store the desired path plan 30 in the data storage device 22, and the vehicle 12 is guided along the desired path plan 30 in an embodiment. In a further embodiment, the vehicle 12 defines, calculates, or determines the desired path plan 30 or receives the desired path plan 30 from an external source.

The processor 24 of the controller 20 calculates an acquisition guidance path 32 along which the vehicle 12 is intended to traverse from an initial vehicle location 34 to the desired guidance path 30. In the illustrated embodiment, the system 10 determines the acquisition guidance path 32 at any time prior to the vehicle 12 executing and traveling along the desired guidance path 30.

The system 10 and the method 100 of one or more embodiments further include the data storage device 22 or another component of the system 10 receiving or the processor 24 or another component of the system 10 otherwise determining, at step 112, a first acquisition factor of the acquisition guidance path 32 between the vehicle 12 and the desired guidance path 30. In the illustrated embodiment, the data storage device 22 receives the first acquisition factor of the acquisition guidance path 32 from the user via the user interface 26. In one or more additional embodiments, the controller 20 generates or otherwise determines the first acquisition factor. In the illustrated embodiment, the first acquisition factor includes, is proportional to, and/or otherwise relates to an attack angle 50 that controls an initial angle of the vehicle 12 to reach the desired guidance path 30. Accordingly, a relatively high first acquisition factor is associated with a relatively higher or aggressive attack angle 50 of the acquisition guidance path 32, as illustrated by a high-first acquisition factor line 40 in FIG. 3. Conversely, a relatively low first acquisition factor is associated with a relatively lower or unaggressive attack angle 50 of the acquisition guidance path 32, as illustrated by low-first acquisition factor line 46 in FIG. 3. The first acquisition factor in the illustrated embodiment allows control or otherwise results in modulation of the attack angle 50, which at least partially affects or controls an amount of time taken by the vehicle 12 to reach the desired guidance path 30 from the initial vehicle location 34. The first acquisition factor is a unitless value in the illustrated embodiment.

The system 10 and the method 100 of one or more embodiments further include the data storage device 22 or another component of the system 10 receiving or otherwise determining, at step 114, a second acquisition factor. The second acquisition factor is defined as a ratio between a lateral error, or lateral or distance gain, and a heading error, or heading gain, of the acquisition guidance path 32 relative to the desired guidance path 30. In the illustrated embodiment, the lateral error is the numerator, while the heading error is the denominator. As such, a relatively low second acquisition factor is associated with a relatively high heading error and a relatively low lateral error, and vice versa. However, in further embodiments, the ratio of the second acquisition factor is reversed such that the heading error is the numerator, the lateral error is the denominator, and a relatively low second acquisition factor is associated with a relatively low heading error and a relatively high lateral error, and vice versa.

In the illustrated embodiment, the data storage device 22 receives the second acquisition factor of the acquisition guidance path 32 from the user via the user interface 26. In one or more additional embodiments, the controller 20 generates or otherwise determines the second acquisition factor. The second acquisition factor is a unitless value in the illustrated embodiment.

The system 10 and the method 100 of one or more embodiments further include the processor 24 or another component of the system 10 calculating, at step 116, the acquisition guidance path 32 based on the first acquisition factor and the second acquisition factor to control travel of the vehicle 12 to the desired guidance path 30.

The system 10 of an embodiment then transmits one or more control signals to the steering control unit 28, such as an automatic steering control unit in a non-limiting example. The steering control unit 28 executes the acquisition guidance path 32 and controls the direction or angle of the vehicle 12 from the initial vehicle location 34 to the desired guidance path 30.

Figure 5:
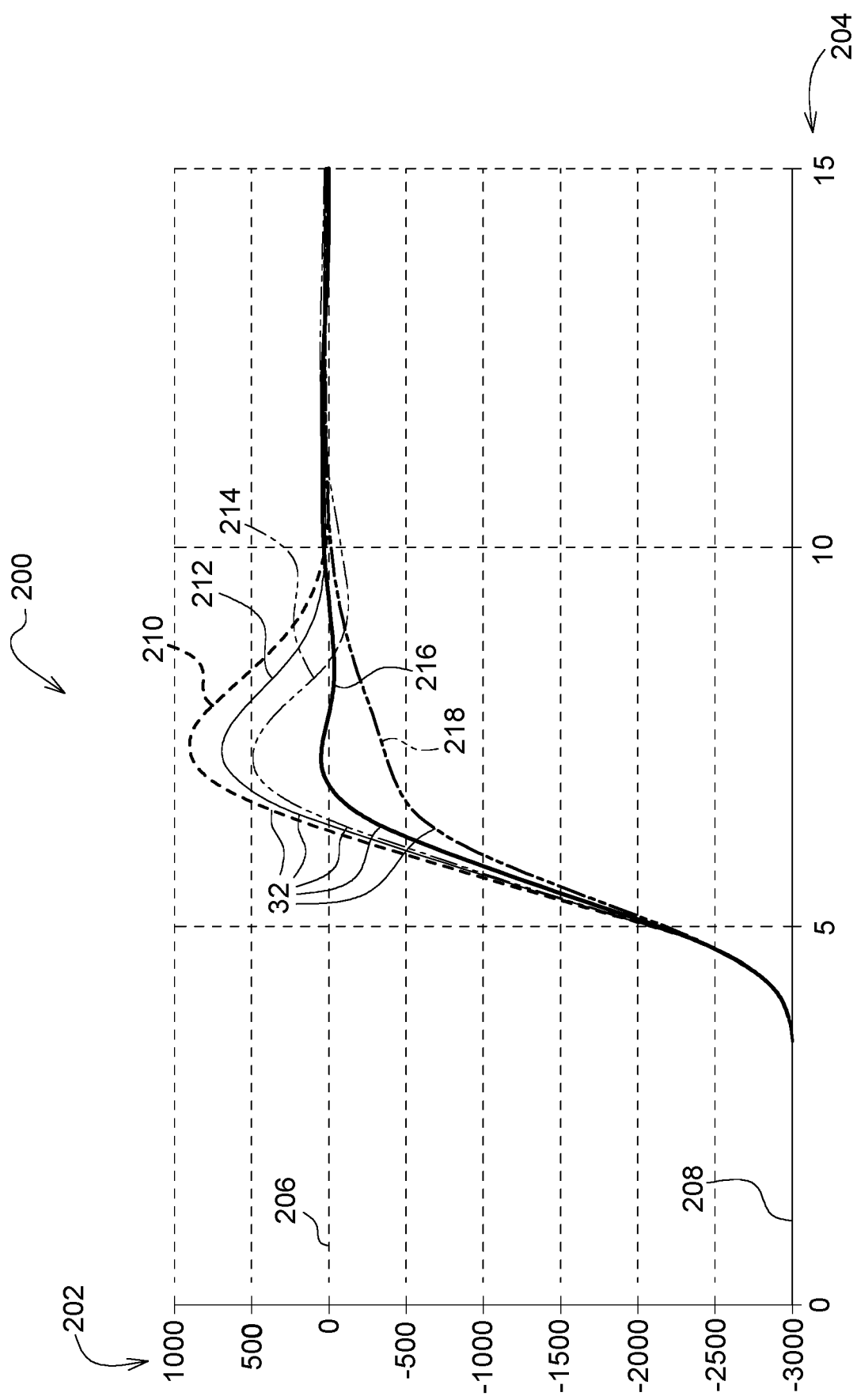
FIG. 5 is a graph of acquisition guidance paths of an acquisition guidance path system for a vehicle in accordance with an embodiment of the present disclosure.

Reference is now made to FIG. 5, which illustrates a lateral distance over time graph 200 of multiple acquisition guidance paths 32 having the same relatively high-first acquisition factor, such as that of the line 40 discussed above and illustrated in FIG. 3, but different second acquisition factors. Distance in millimeters of the vehicle 12 from the desired guidance path 30 is illustrated along the y-axis 202, and elapsed time in seconds is provided along the x-axis 204. The 0-distance point 206 on the y-axis 202 represents the desired guidance path 30, and the −3000-distance point 208 represents the initial vehicle location 34.

The first acquisition factor in the graph 200 is a relatively aggressive approach of the desired guidance path 30 having an aggressive initial angle toward the desired guidance path 30. The attack angle 50 may affect control of an amount of time taken by the vehicle 12 to reach the desired guidance path 30 from the initial vehicle location 34.

Referring again to FIG. 3 with continuing reference to FIG. 5, a first line 210 corresponds with the unadjusted acquisition guidance path 40 formed with a second acquisition factor of 0. The second acquisition factor includes or is associated with an overshoot factor configured to control overshoot of the desired guidance path 30 by the vehicle 12. As such, the first line 210, having a second acquisition factor of 0, has an uncontrolled overshoot portion 42 of its path 40.

A second line 212 corresponds with an acquisition guidance path having a second acquisition factor of 10%. The processor 24 and/or controller 20 of the illustrated embodiment is configured to calculate the acquisition guidance path 32 using the second acquisition factor to reduce overshoot of the desired guidance path 30 by the vehicle 12 by increasing the heading error and proportionally decreasing the lateral error. Therefore, in the illustrated embodiment, the heading error is increased by 10% and the lateral error is decreased by 10%. Similarly, a third line 214 corresponds with an acquisition guidance path having a second acquisition factor of 20% such that the heading error is increased by 20% and the lateral error is decreased by 20%. Similarly, a fourth line 216 corresponds with an acquisition guidance path having a second acquisition factor of 30% such that the heading error is increased by 30% and the lateral error is decreased by 30%.

Finally, a fifth line 218 of the graph 200 of the illustrated embodiment corresponds with an acquisition guidance path 32 having a second acquisition factor of 40% such that the heading error is increased by 40% and the lateral error is decreased by 40%. The fifth line 218 is associated with the adjusted acquisition guidance path 44 having no overshoot of the desired guidance path 30, as illustrated in FIG. 3.

Although not illustrated, in one or more additional embodiments of the present disclosure, a second acquisition factor is a negative number, such as −10%, −20%, −30%, −40%, etc. to name non-limiting examples. As such, rather than reducing overshoot, as illustrated in FIGS. 3 and 5, the negative second acquisition factor increases overshoot as required or desired by the operator or user. In a non-limiting example for illustrative purposes, the user may wish to increase overshoot in order to tow an implement more quickly to the desired guidance path 30 with greater accuracy and efficiency over a work area. In such a case, the processor 24 and/or the controller 20 calculates the acquisition guidance path 32 with the negative second acquisition factor to increase overshoot of the desired guidance path 30 by the vehicle 12 by decreasing the heading error and proportionally increasing the lateral error of the acquisition guidance path 32.

Figure 6:
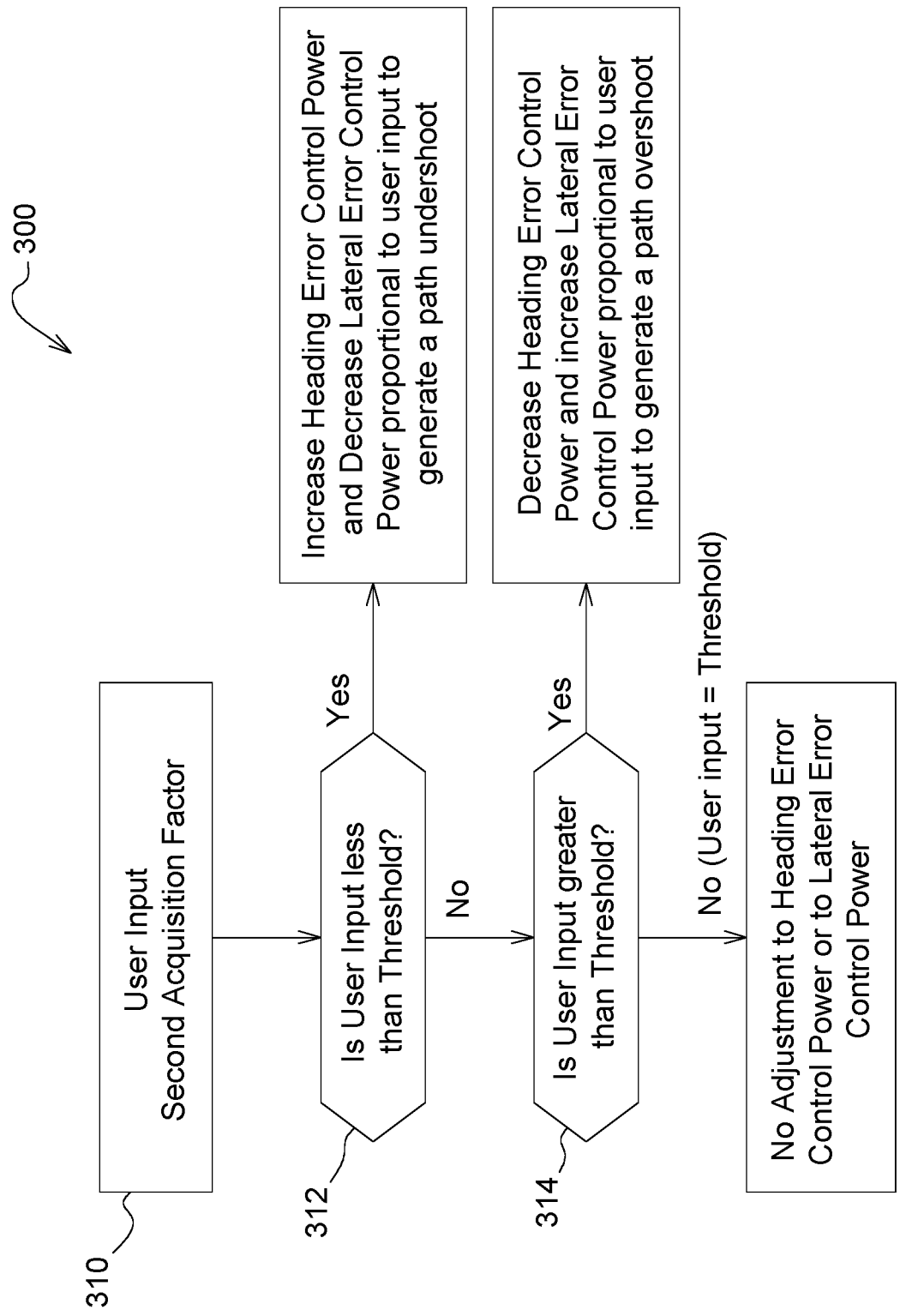
FIG. 6 is a flow chart of a method of determining an acquisition guidance path for a vehicle in accordance with an embodiment of the present disclosure.

Reference is now made to FIG. 6, which illustrates a method 300 of determining the acquisition guidance path 32 in accordance with one embodiment of the present disclosure. Each of the steps or functions of the method 300 or any other method of one or more embodiments may be implemented by the processor 24 and/or the controller 20 upon receiving or otherwise considering the second acquisition factor.

In the illustrated embodiment, the controller 20 receives the second acquisition factor from the user at box 310. In one or more embodiments of the method 100 or the method 300 not illustrated, the system 10 determines the first and/or second acquisition factor and/or the system 10 maintains an adjustable or predetermined default value for the first and/or second acquisition factor such that the methods 100, 300 of particular embodiments do not receive a factor input from the user for each execution of the methods 100, 300, but rather determine one or both factor(s) independently or reference one or more default factor(s) to execute the methods 100, 300.

The controller 20 then determines whether the second acquisition factor is less than a threshold at box 312. If the second acquisition factor is less than the threshold, the controller 20 increases heading error control power and decreases lateral error control power, thereby generating a path undershoot proportional to the second acquisition factor.

If the second acquisition factor is not less than the threshold, the controller 20 determines whether the second acquisition factor is greater than the threshold at box 314. If the second acquisition factor is greater than the threshold, the controller 20 decreases heading error control power and increases lateral error control power, thereby generating a path overshoot proportional to the second acquisition factor. Finally, if the controller 20 determines that the second acquisition factor is not greater than the threshold at box 314, the controller 20 determines that the second acquisition factor is equal to the threshold and does not use the second acquisition factor to implement any adjustment to the heading error control power or the lateral error control power.

The system 10 and methods of particular embodiments of the present disclosure provide enhanced control of the vehicle 12 by allowing an operator of the vehicle 12 to reduce, eliminate, or increase overshoot or undershoot of the desired guidance path 30 along the acquisition guidance path 32. For example, the vehicle 12 may be a combine harvester or other work vehicle, and the operator may wish to approach the desired guidance path 30 as quickly and/or directly as possible without crossing a boundary running adjacent to the desired guidance path 30. The system 10 and methods 100, 300 allow the operator to input a first acquisition factor associated with a high attack angle 50 to approach the desired guidance path 30 in minimal time and a second acquisition factor, such as 30% or 40%, preventing overshooting of the desired guidance path 30, such as the acquisition guidance path 44 illustrated in FIG. 3. In another example, the vehicle 12 may be a tractor towing an implement, and the operator may wish to approach the desired guidance path 30 as quickly and/or directly as possible with normal or even increased overshoot in order to quickly and accurately bring the towed implement onto the desired guidance path 30. The system 10 and methods 100, 300 allow the operator to input a first acquisition factor associated with a high attack angle 50 to approach the desired guidance path 30 in minimal time and a second acquisition factor, such as 0% or a negative second acquisition factor, that allows overshooting of the desired guidance path 30 by the tractor or other vehicle 12 to bring the towed implement quickly inline with the desired guidance path 30, such as the acquisition guidance path 32 illustrated in FIG. 3. In additional embodiments not illustrated, the vehicle 12 may include one or more passenger vehicles, work vehicles, or other vehicles configured to determine, generate, follow, and/or travel relative to a path plan or guidance path.

One will appreciate the many acquisition guidance paths 32, including paths 32 having a low or high attack angle 50 and paths 32 having any degree of undershoot or overshoot, that may result from the combination of first and second acquisition factors input by operators of the vehicle 12 in accordance with one or more embodiments of the system 10 and/or methods 100, 300 described herein. Accordingly, the system 10 and the methods 100, 300 increase control for the vehicle 12 and operator. Further, by allowing more direct and accurate travel by the vehicle 12, the system 10 and methods 100, 300 increase energy efficiency of the vehicle 12, accomplish more work in the work area in less time, and result in higher performance work by improving coverage and accuracy across the work area.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A method of determining an acquisition guidance path of a vehicle, the method comprising:

defining a desired guidance path for travel by the vehicle;

determining a first acquisition factor of the acquisition guidance path between the vehicle and the desired guidance path;

determining a second acquisition factor defining a ratio between a heading error and a lateral error of the acquisition guidance path; and calculating the acquisition guidance path based on the first acquisition factor and the second acquisition factor to control travel of the vehicle to the desired guidance path.

2. The method of claim 1, wherein the first acquisition factor comprises an attack angle configured to control an initial angle of the vehicle to reach the desired guidance path.

3. The method of claim 2, wherein the attack angle is further configured to control an amount of time taken by the vehicle to reach the desired guidance path.

4. The method of claim 1, wherein the second acquisition factor comprises an overshoot factor configured to control overshoot of the desired guidance path by the vehicle.

5. The method of claim 1, wherein determining the second acquisition factor comprises reducing overshoot of the desired guidance path by the vehicle by increasing the heading error and proportionally decreasing the lateral error of the acquisition guidance path.

6. The method of claim 1, wherein determining the second acquisition factor comprises increasing overshoot of the desired guidance path by the vehicle by decreasing the heading error and proportionally increasing the lateral error of the acquisition guidance path.

7. The method of claim 1, wherein determining a first acquisition factor comprises receiving a first acquisition factor input from an operator.

8. The method of claim 1, wherein the first acquisition factor is a unitless value.

9. The method of claim 1, wherein determining a second acquisition factor comprises receiving a second acquisition factor input from an operator.

10. The method of claim 1, wherein the second acquisition factor is a unitless value.

11. An acquisition guidance path system for a vehicle, the system comprising:
a location-determining receiver configured to determine the location of the vehicle;
a data storage device configured to provide a desired guidance path for travel by the vehicle, a first acquisition factor of an acquisition guidance path between the vehicle and the desired guidance path, and a second acquisition factor defining a ratio between a heading error and a lateral error of the acquisition guidance path; and
an electronic data processor configured to calculate the acquisition guidance path based on the first acquisition factor and the second acquisition factor to control travel of the vehicle to the desired guidance path.

12. The system of claim 11, wherein the first acquisition factor comprises an attack angle configured to control an initial angle of the vehicle to reach the desired guidance path.

13. The system of claim 12, wherein the attack angle is further configured to control an amount of time taken by the vehicle to reach the desired guidance path.

14. The system of claim 11, wherein the second acquisition factor comprises an overshoot factor configured to control overshoot of the desired guidance path by the vehicle.

15. The system of claim 11, wherein the electronic data processor is configured to calculate the acquisition guidance path to reduce overshoot of the desired guidance path by the vehicle by increasing the heading error and proportionally decreasing the lateral error with the second acquisition factor of the acquisition guidance path.

16. The system of claim 11, wherein the electronic data processor is configured to calculate the acquisition guidance path to increase overshoot of the desired guidance path by the vehicle by decreasing the heading error and proportionally increasing the lateral error with the second acquisition factor of the acquisition guidance path.

17. The system of claim 11, further comprising a user interface configured to receive at least one of the first acquisition factor and the second acquisition factor from a user.

18. The system of claim 11, wherein the first acquisition factor is a unitless value.

19. The system of claim 11, wherein the second acquisition factor is a unitless value.

20. The system of claim 11, further comprising an automatic steering system configured to steer the vehicle along the acquisition guidance path.

* * * * *